United States Patent
Zhang et al.

(10) Patent No.: US 10,416,628 B2
(45) Date of Patent: Sep. 17, 2019

(54) REAL VEHICLE IN-THE-LOOP TEST SYSTEM AND METHOD

(71) Applicant: Baidu Online Network Technology (Beijing) Co., Ltd., Beijing (CN)

(72) Inventors: Tianlei Zhang, Beijing (CN); Wenli Yang, Beijing (CN); Yuchang Pan, Beijing (CN); Haowen Sun, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 226 days.

(21) Appl. No.: 15/387,430

(22) Filed: Dec. 21, 2016

(65) Prior Publication Data

US 2018/0017950 A1 Jan. 18, 2018

(30) Foreign Application Priority Data

Jul. 15, 2016 (CN) .......................... 2016 1 0561751

(51) Int. Cl.
*G05B 17/02* (2006.01)
*G01M 13/026* (2019.01)
*G01M 17/007* (2006.01)
*G07C 5/00* (2006.01)
(Continued)

(52) U.S. Cl.
CPC .......... *G05B 17/02* (2013.01); *B60R 16/0231* (2013.01); *G01M 13/026* (2013.01); *G01M 17/007* (2013.01); *G07C 5/008* (2013.01); *G08G 1/0129* (2013.01)

(58) Field of Classification Search
CPC .. G05B 17/02; G01M 17/007; G01M 13/026; G07C 5/008; B60R 16/0231; G08G 1/0129
See application file for complete search history.

(56) References Cited

U.S. PATENT DOCUMENTS

| | | | | |
|---|---|---|---|---|
| 2002/0062207 A1* | 5/2002 | Faghri | ....................... | G08G 1/00 703/8 |
| 2007/0275355 A1* | 11/2007 | Langer | ................ | G01M 17/007 434/29 |

FOREIGN PATENT DOCUMENTS

| | | | | | |
|---|---|---|---|---|---|
| CN | | 105652690 A | * | 6/2016 | |
| WO | WO-2015166563 A1 | * | 11/2015 | ........... | G05B 19/056 |

* cited by examiner

*Primary Examiner* — Abby Y Lin
*Assistant Examiner* — Kelly D Williams
(74) *Attorney, Agent, or Firm* — Knobbe Martens Olson & Bear LLP (57) ABSTRACT

Embodiments of real vehicle in-the-loop test systems and methods are disclosed. The system can include a sensor configured to acquire state information and location information of a real vehicle and environment information of an emulation test environment where the vehicle is located; an interaction module configured to acquire a test task in response to the instruction entered by a user, an emulation test environment of the test task comprises a test situation, a map, and an intelligent agent; a vehicle sensing module configured to acquire the state information, the location information, and the environment information from the sensor; and a test task control module configured to receive the test task from the interaction module, the state information and the location information from the vehicle sensing module and load them to the emulation test environment, control the real vehicle to execute the test task, and generate and send the test result.

15 Claims, 5 Drawing Sheets

(51) Int. Cl.
*B60R 16/023* (2006.01)
*G08G 1/01* (2006.01)

REAL VEHICLE IN-THE-LOOP TEST SYSTEM AND METHOD

CROSS-REFERENCE TO RELATED APPLICATION

This application claims priority to Chinese Patent Application No. 201610561751.X, entitled "REAL VEHICLE IN-THE-LOOP TEST SYSTEM AND METHOD" filed on Jul. 15, 2016, which is incorporated herein by reference in its entirety.

TECHNICAL FIELD

The present disclosure relates to the field of vehicle test technology, and in particular, to a real vehicle in-the-loop testing system and method.

BACKGROUND

With the development of the society, vehicles have become commonly used transport means. To ensure good performance and driving safety of a vehicle in different environments, before the vehicle design is finalized, a series of test experiments are needed to test functionalities such as decision control of the vehicle. The vehicle test may generally comprise an emulation test and a real road test. Between the emulation test and the real road test, an emulation test in which a real vehicle participates, that is, a real vehicle in-the-loop test, is generally needed.

Generally, the real vehicle in-the-loop test needs to input map data, situation data, traffic flow data and the like into the real vehicle through emulation, and then the performance and safety of the real vehicle are tested on a large open ground. However, the test environment used in the conventional real vehicle in-the-loop test is simplistic, and cannot provide an intelligent traffic flow simulation. The testing effect can hardly achieve the effect of simulating a real road, causing an inaccurate and incomplete test result of the real vehicle in-the-loop test.

SUMMARY

An objective of the present disclosure is to provide an improved real vehicle in-the-loop test system and method, to solve the technical problems mentioned in the background.

In the first aspect, the present disclosure provides a sensor, mounted on a real vehicle, and configured to acquire state information and location information of the real vehicle, and environment information of an emulation test environment where the real vehicle is located; an interaction module, configured to provide a man-machine interaction interface for a user, and to acquire a test task corresponding to an instruction in response to the instruction entered by the user, the test task comprising a test content and an emulation test environment, the emulation test environment comprising a test situation, a map, and an intelligent agent; a vehicle sensing module, configured to acquire the state information, the location information, and the environment information from the sensor; and a test task control module, configured to receive the test task from the interaction module, the state information and the location information of the real vehicle from the vehicle sensing module, and to load the state information and the location information of the real vehicle to the emulation test environment, causing the sensor to acquire the environment information, control the real vehicle to execute the test task, generate the test result, and send the test result to the interaction module.

In some embodiments, the system further comprises: a test situation module, configured to store the test situation; an intelligent agent module, configured to store an intelligent agent, the intelligent agent comprising traffic elements of which motion states are determined based on a motion state of the real vehicle; and a map module, configured to store the map.

In some embodiments, the system further comprises: a test task set module, configured to store historical test tasks; and the interaction module is configured to select a test task corresponding to a first instruction from the test task set module, in response to the first instruction entered by the user being received.

In some embodiment, the interaction module is further configured to select a test situation, an intelligent agent, and a map corresponding to a second instruction respectively from the test situation module, the intelligent agent module, and the map module, in response to the second instruction entered by the user being received, to generate the emulation test environment; and combine the emulation test environment with a preset test content to generate the test task, and store the test task to the test task set module in response to a third instruction entered by the user being received.

In some embodiments, the test task control module is further configured to control the real vehicle to suspend or terminate the test task; and the interaction module is further configured to: control the test task control module to suspend or terminate the test task in response to a fourth instruction entered by the user being received.

In some embodiments, the system further comprises: a monitoring module, configured to monitor working conditions of the test task control module, the interaction module, the vehicle sensing module, the test situation module, the intelligent agent module, the map module, and the test task set module.

In the second aspect, the present disclosure provides a real vehicle in-the-loop test method, the method comprises: receiving, by a test task control module, a test task sent by an interaction module, the test task comprising a test content and an emulation test environment, and the emulation test environment comprising a target test situation, a target map, and a target intelligent agent; acquiring, by a vehicle sensing module, first state information and first location information of the real vehicle from a sensor on the real vehicle, the first state information and the first location information being state information and location information of the real vehicle before executing the test task; loading, by the test task control module, the first state information and the first location information to the emulation test environment, causing the sensor to acquire environment information of the emulation test environment; and controlling, by the test task control module, the real vehicle to execute the test task; and receiving, by the test task control module, second state information and second location information of the real vehicle sent by the vehicle sensing module, generating the test result of the test task; and sending the test result to the interaction module, the second state information and the second location information being state information and location information of the real vehicle acquired in real time from the sensor of the real vehicle by the vehicle sensing module in the process of executing the test task.

In some embodiment, the method further comprises: selecting and loading, by the interaction module, a target test situation, a target intelligent agent, and a target map corresponding to a second instruction respectively from a test situation module, an intelligent agent module, and a map module, in response to the second instruction entered by the user being received, to generate the emulation test environment; and combining, by the interaction module, the emulation test environment with a preset test content to generate the test task, and storing the test task to a test task set module in response to a third instruction entered by the user being received.

In some embodiments, the method further comprises: selecting, by the interaction module, the test task corresponding to a first instruction from the test task set module, in response to the first instruction entered by the user being received.

In some embodiments, after the controlling, by the test task control module, the real vehicle to execute the test task, the method further comprises: controlling, by the test task control module, the real vehicle to suspend or terminate the test task in response to a fourth instruction sent by the interaction module being received.

In some embodiments, the test situation module is configured to store a test situation; the intelligent agent module is configured to store an intelligent agent, the intelligent agent comprising traffic elements of which motion states are determined based on a motion state of the real vehicle; and the map module is configured to store a map.

In some embodiments, the method further comprises: monitoring, by a monitoring module, working conditions of the test task control module, the interaction module, the vehicle sensing module, the test situation module, the intelligent agent module, the map module, and the test task set module.

In the real vehicle in-the-loop test system and method according to the present disclosure, in response to an instruction entered by a user, an interaction module therein may acquire a test task corresponding to the instruction and comprising a test content and an emulation test environment, the emulation test environment may comprise a test situation, a map, and an intelligent agent, a vehicle sensing module may acquire, from a sensor mounted on the real vehicle, state information and location information of the real vehicle sensed by the sensor, a test task control module loads the state information and the location information of the real vehicle to the emulation test environment, and controls the real vehicle to execute the test task, to acquire the test result, thereby implementing acquisition of a great number of emulation test environments by integrating the intelligent agent with the test situation and the map, and the intelligent agent can trigger multiple possible behaviors in the same emulation test environment, which ensures the completeness of the test and improves the accuracy rate of the test.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
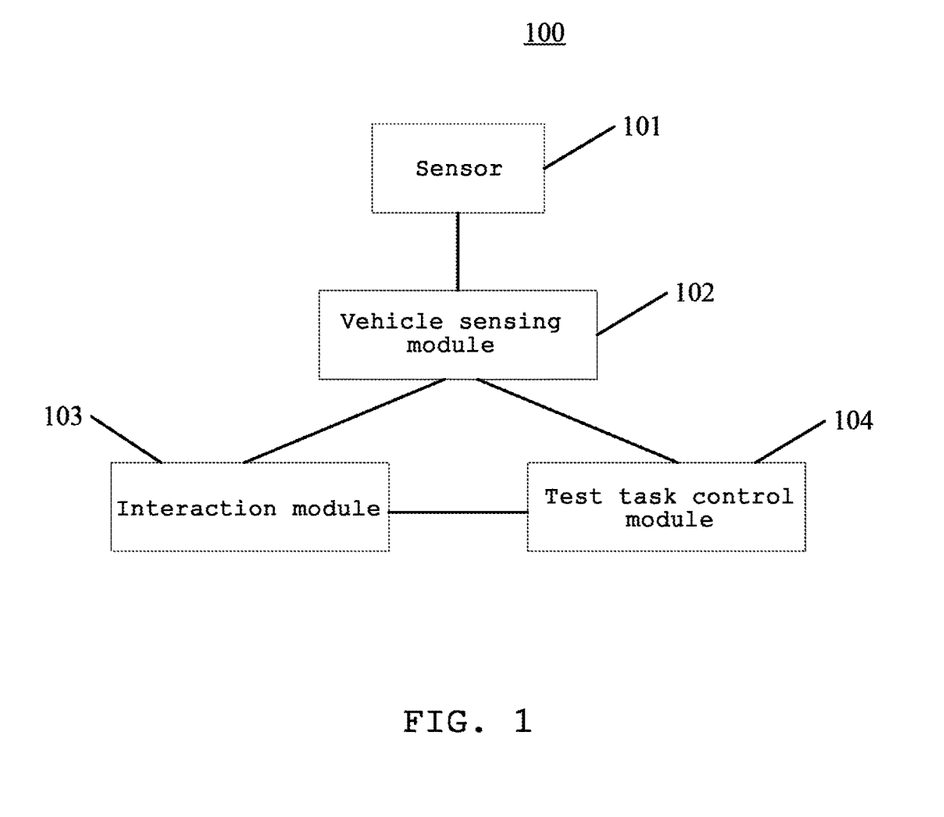
FIG. 1 shows a system architectural diagram of a real vehicle in-the-loop test system according to some embodiments of the present disclosure.

FIG. 1 shows a system architectural diagram 100 of a real vehicle in-the-loop test system according to the present application. As shown in the drawing, the real vehicle in-the-loop test system 100 may comprise a sensor module 101, a vehicle sensing module 102, an interaction module 103, and a test task control module 104. The sensor module 101 may be in communication connection with the vehicle sensing module 102, the vehicle sensing module 102 may be in communication connection with the interaction module 103, and the test task control module 104 may be in communication connection with the vehicle sensing module 102 and the interaction module 103 separately.

In this embodiment, the sensor module 101 may be mounted on a real vehicle, and the sensor module 101 may acquire state information and location information of the real vehicle in real time. Moreover, when the real vehicle has been in an emulation test environment, the sensor module 101 may sense environment information of the emulation test environment where the real vehicle is located. The interaction module 103 may provide a man-machine interaction interface for a user, such that the interaction module 103 may acquire a test task corresponding to an instruction in response to the instruction entered by the user. Here, the test task may comprise a test content and an emulation test environment, for example, the test content may be a decision control algorithm of the vehicle, and the test task may be testing the performance of the decision control algorithm of the vehicle in a specific emulation test environment. It should be noted that, the emulation test environment may comprise at least a test situation, a map, and an intelligent agent. Here, the user may select, through the interaction module 103, a test situation, a map, and an intelligent agent that are needed by the emulation test environment. The vehicle sensing module 102 may acquire the state information and the location information of the real vehicle from the sensor module 101.

In this embodiment, the test task control module 104 may receive the test task from the interaction module 103, and here, the test task comprises an emulation test environment. The test task control module 104 may further acquire the state information and the location information of the real vehicle from the vehicle sensing module 102, then load the state information and the location information of the real vehicle to the emulation test environment, such that the sensor module 101 may sense environment information of the emulation test environment where the real vehicle is located, and the test task control module 104 may control the real vehicle to execute the test task, finally generate the test result of the test task, and send the test result to interaction module 103, such that the user may know the test result of the test task through 103.

In the real vehicle in-the-loop test system 100 according to the present application, in response to an instruction entered by a user, the interaction module 103 therein may acquire a test task corresponding to the instruction and comprising a test content and an emulation test environment, the emulation test environment may comprise a test situation, a map, an intelligent agent, the vehicle sensing module 102 may acquire, from the sensor module 101 mounted on the real vehicle, state information and location information of the real vehicle sensed by the sensor module 101, the test task control module 104 may load the state information and the location information of the real vehicle to the emulation test environment, and control the real vehicle to execute the test task, to acquire the test result, thereby implementing acquisition of a great number of emulation test environments by integrating the intelligent agent with the test situation and the map, and the intelligent agent can trigger multiple possible behaviors in the same emulation test environment, which improves the completeness and the accuracy rate of the test.

Figure 2:
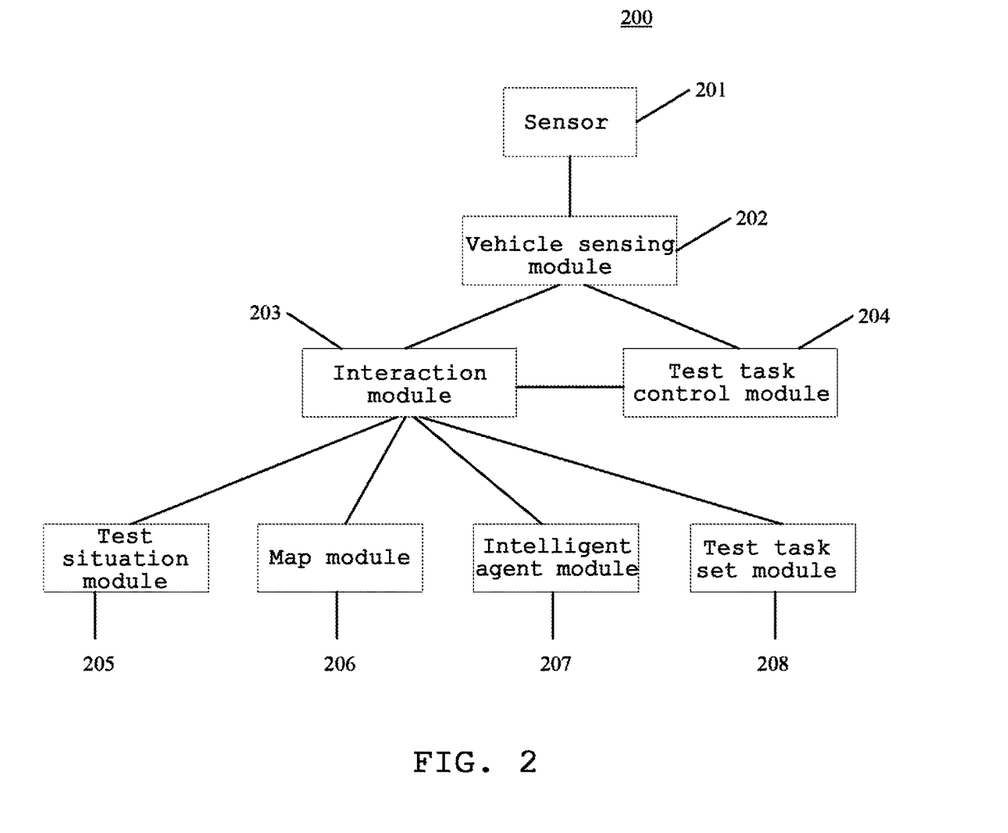
FIG. 2 shows a system architectural diagram of a real vehicle in-the-loop test system according to some embodiments of the present disclosure.

Continue to refer to FIG. 2, it is a system architectural diagram 200 of another embodiment of real vehicle in-the-loop test system according to the present application. As shown in the drawing, the real vehicle in-the-loop test system 200 may comprise a sensor module 201, a vehicle sensing module 202, an interaction module 203, and a test task control module 204, a test situation module 205, a map module 206, an intelligent agent module 207, and a test task set module 208. The sensor module 201 may be in communication connection with the vehicle sensing module 202, the vehicle sensing module 202 may be in communication connection with the interaction module 203, and the test task control module 204 may be in communication connection with the vehicle sensing module 202 and the interaction module 203 separately. It should be noted that, the interaction module 203 may further be in communication connection with the test situation module 205, the map module 206, the intelligent agent module 207, and the test task set module 208, as shown in FIG. 2.

In some embodiments, the test task set module 208 may store a great number of historical test tasks. In response to a first instruction entered by the user, the interaction module 203 may select a test task corresponding to the first instruction from the test task set module 208. The test task set module 208 may enable the user to reproduce the historical test tasks quickly, thereby improving the efficiency of test. At the same time, the test task set module 208 is in communication connection with the interaction module 203, and therefore, test tasks in the test task set module 208 may be stored or updated in time.

In some embodiments, in response to a second instruction entered by the user, the interaction module 203 may further select a test situation required by the test task from the test situation module 205, select a map required by the test task from the map module 206, select an intelligent agent required by the test task from the intelligent agent module 207, and may integrate the test situation, the map, and the intelligent agent to generate an emulation test environment of the test task. The interaction module 203 may combine the emulation test environment with a preset test content to generate a test task.

In some optional implementations of some embodiments, the interaction module 203 may further store the generated test task to the test task set module 208 in response to a third instruction entered by the user. When the user needs to test the test task again, the interaction module 203 may acquire the test task directly from the test task set module 208, without the need of executing the operation of generating the test task again.

Generally, the test situation module 205 may store a great number of test situations, and further, the test situation module 205 may further manage, such as classify, the test situations therein. The test situation here may be a combination of classes such as weather (for example, a sunny day, a rainy day, and the like), a road structure (for example, a one-way street, a multi-way street, and the like), a traffic light condition (for example, a road having a traffic light and the red light is on, and the like), and obstacle information (for example, there is a building ahead, and the like), and correspondingly, the test situation module 205 may conduct classification according to the weather, the road structure, the traffic light condition, the obstacle information, and the like. The map module 206 may store a great number of maps, and further, the map module 206 may further manage, such as classify, the maps therein. For example, the map herein may be classified into highways, urban roads, country roads, and the like. The user may select maps of different classifications through the interaction module 203 according to requirements of the test task. The intelligent agent module 207 may store a great number of intelligent agents, and further, the intelligent agent module 207 may further manage, such as classify, the intelligent agents therein. For example, classification may be made here according to a driving speed of the intelligent agent, whether it is a violation driving, and the like. Generally, the intelligent agent may comprise traffic elements of which specific motion states are determined based on a motion state of the real vehicle in the test task, and here, the traffic elements may comprise pedestrians, bicycles, cars, and the like, and the traffic elements may comprise specific behavior modes, such as crossing the road, giving way, and changing lane. Compared with the prior art, the intelligent agent in some embodiments has stronger consciousness, and therefore, the intelligent agent can trigger multiple possible behaviors in the same emulation test environment, which improves the completeness and accuracy of the test. For example, the intelligent agent may determine, according to an actual traffic condition, whether to terminate a specific behavior, for example, when crossing the road, if there is another vehicle passing quickly, an intelligent agent pedestrian may choose to give up crossing the road.

In some optional implementations of some embodiments, the test task control module 204 may further control the real vehicle to suspend or terminate the test task. Therefore, in the case of the real vehicle or real vehicle in-the-loop test system 200 is failed, the user may quickly intervene in the test to suspend or terminate the test task. It should be noted that, the user may input a fourth instruction through the interaction module 203, causing the test task control module 204 to receive the fourth instruction to suspend or terminate the test task.

In some optional implementations of some embodiments, the real vehicle in-the-loop test system 200 may further comprise a monitoring module. The monitoring module is mainly configured to monitor working conditions of the test task control module 204, the vehicle sensing module 202, the interaction module 203, the test situation module 205, the map module 206, the intelligent agent module 207, and the test task set module 208, thereby ensuring the completeness of the system 200 in the process of test. Further, the monitoring module may further coordinate works between the modules, for example, the monitoring module may enable the test task control module 204 to first receive the test task sent by the interaction module 203, and then execute the test task.

In the real vehicle in-the-loop test system 200 provided in some embodiments of the present disclosure, the interaction module 203 therein may acquire a test task from the test task set module 208 based on a first instruction; or the interaction module 203 may further acquire, based on a second instruction, a test situation, a map, and an intelligent agent that are required by the test task from the test situation module 205, the map module 206, and the intelligent agent module 207, to generate an emulation test environment, thereby obtaining the test task, and finally, the test task control module 204 executes the test task and acquires the test result, thereby obtaining a great number of emulation test environments by integrating different test situations, maps, and intelligent agents, and improving the completeness of the test; moreover, the intelligent agent can trigger multiple possible behaviors in the same emulation test environment, which further improves the completeness of the test, and ensures the accuracy rate of the test task.

Figure 3:
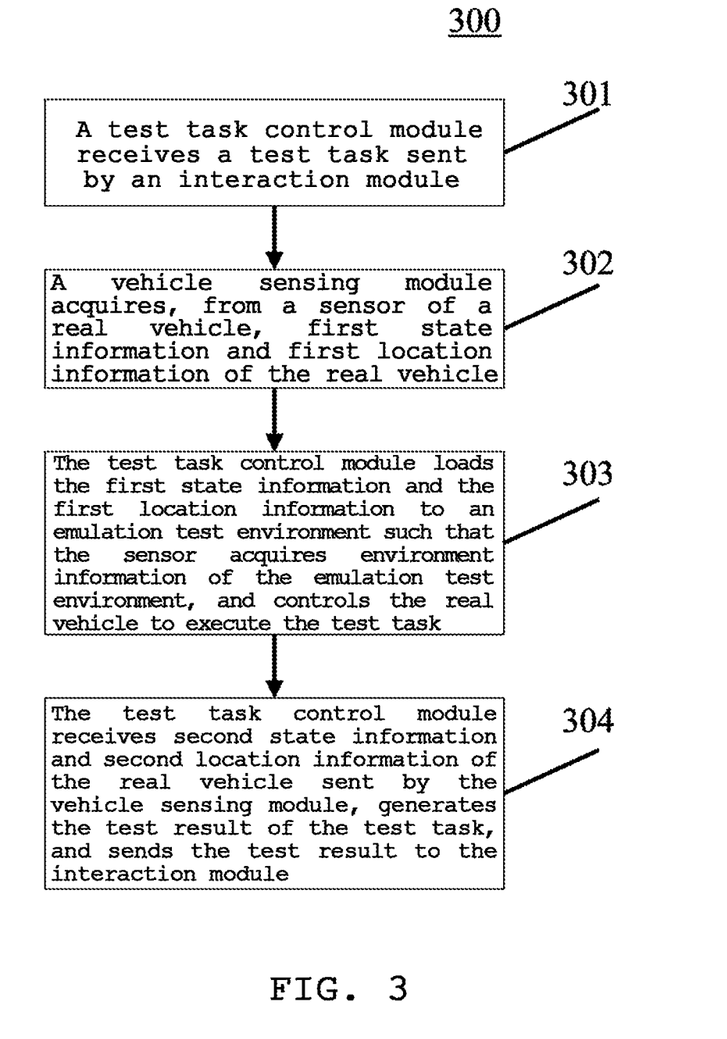
FIG. 3 shows a flowchart of a real vehicle in-the-loop test method according to some embodiments of the present disclosure.

Further referring to FIG. 3, a procedure 300 of a real vehicle in-the-loop test method according to some embodiments of the present disclosure is shown. The real vehicle in-the-loop test method may adopt the real vehicle in-the-loop test system shown in FIG. 1 or FIG. 2 to test the real vehicle, and the method comprises the following steps:

Step 301: A test task control module receives a test task sent by an interaction module.

In some embodiments, the test task control module in the real vehicle in-the-loop test system may be connected to the interaction module therein through, for example, wireless communication, such that the test task control module may receive the test task sent by the interaction module. Generally, the interaction module may provide a man-machine interaction interface for a real vehicle test to a user, and the user may configure, through the interaction module, a test task that needs to be tested by the real vehicle. Here, the test task may comprise a test content and an emulation test environment. The test task may be described as testing a certain test content in a certain emulation test environment. For example, the test content may be "the performance of a decision control system of a real vehicle", the emulation test environment may be "a sunny day, a crossroad of an urban road without a traffic light, a pedestrian crossing the road", and the test task may be described as "testing the performance of a decision control system of a real vehicle in an emulation test environment of a pedestrian crossing the road at a crossroad of an urban road without a traffic light in a sunny day". It should be noted that, the emulation test environment in the test task may comprise at least a target test situation, a target map, and a target intelligent agent.

Step 302: A vehicle sensing module acquires, from a sensor of the real vehicle, first state information and first location information of the real vehicle.

In some embodiments, the vehicle sensing module in the real vehicle in-the-loop test system configured to test the real vehicle may acquire, from the sensor mounted on the real vehicle, the first state information and the first location information of the real vehicle. Here, the first state information and the first location information are state information and location information of the real vehicle before executing the test task.

The state information of the real vehicle may be one or more items of information such as whether the real vehicle is moving, motion speed, motion acceleration, yaw angle, yaw rate, and displacements in a longitudinal direction, a lateral direction, and a vertical direction, and the like. The location information of the real vehicle may be information such as GPS coordinates of the real vehicle. It should be noted that, the user may set, according to actual requirements, specific state information and location information that need to be acquired by the sensor in the real vehicle.

Generally, the real vehicle may have a sensor mounted thereto, and the sensor may acquire, in real time, state information and location information of the real vehicle where the sensor is located, and environment information of an emulation test environment. The vehicle sensing module in the real vehicle in-the-loop test system configured to test the real vehicle may be connected to the sensor, to acquire the state information and the location information of the real vehicle, and the environment information of the emulation test environment where the real vehicle is located.

Step 303: The test task control module loads the first state information and the first location information to the emulation test environment causing the sensor to acquire the environment information of the emulation test environment, and to control the real vehicle to execute the test task.

In some embodiments, the test task control module may be a module in the real vehicle in-the-loop test system configured to test the real vehicle, and based on the first state information and the first location information of the real vehicle acquired in step 302, the test task control module may load the first state information and the first location information to the emulation test environment, such that the location and state of the real vehicle may be integrated with the emulation test environment. Then, the sensor of the real vehicle may sense environment information of the emulation test environment where the real vehicle is located. Finally, the test task control module may control the real vehicle to execute the test task.

Step 304: The test task control module receives second state information and second location information of the real vehicle sent by the vehicle sensing module, generates the test result of the test task, and sends the test result to the interaction module.

In some embodiments, in the process of the real vehicle executing the test task, the sensor on the real vehicle can acquire the second state information and the second location information of the real vehicle where the sensor is located. Then, the vehicle sensing module may acquire, from the sensor, the second state information and the second location information, and send them to the test task control module. After receiving the second state information and the second location information, the test task control module may generate the test result of the test task according to them, and may send the test result to the interaction module, such that the user may acquire the test result through the interaction module. For example, the test task control module acquires a driving time, a driving distance, and the like of the real vehicle in a certain emulation test environment, the test task control module may generate the test result (for example, an average speed) of the real vehicle, then send the test result to the interaction module, such that the user may determine the performance of the real vehicle through the interaction module.

In the real vehicle in-the-loop test method provided in some embodiments of the present disclosure, the test task control module receives a test task sent by the interaction module and comprising a test content and an emulation test environment, the emulation test environment may comprise at least a test situation, a target map, and a target intelligent agent, the test task control module loads first state information and first location information of the real vehicle sent by the vehicle sensing module to the emulation test environment, controls the real vehicle to execute the test task, and then acquires the test result according to second state information and second location information of the real vehicle sent by the vehicle sensing module. The test task of the method may comprise a great number of different emulation test environments, and the intelligent agent can trigger multiple possible behaviors in the same emulation test environment, thereby ensuring the completeness of the test and improving the accuracy rate of the test.

Figure 4:
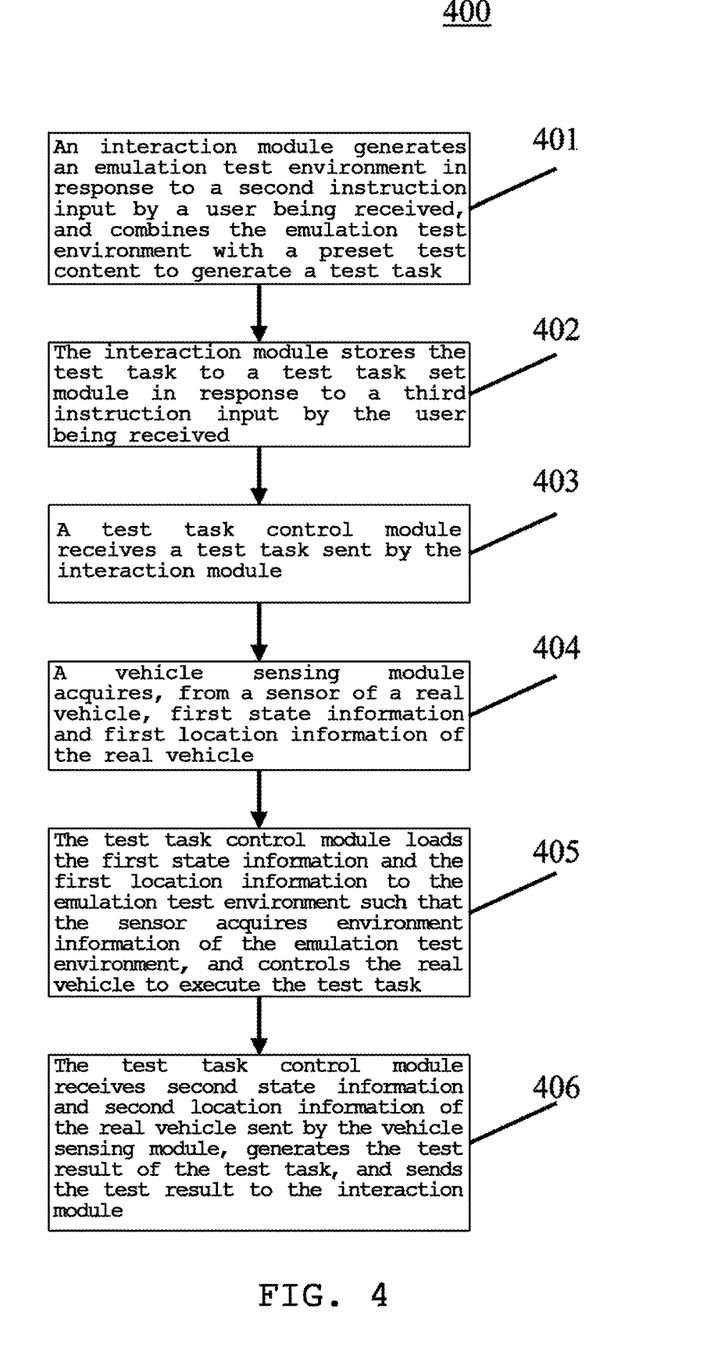
FIG. 4 shows a flowchart of a real vehicle in-the-loop test method according to some embodiments of the present disclosure.

Further referring to FIG. 4, a procedure 400 of a real vehicle in-the-loop test method according to the some embodiments of present disclosure is shown. In some embodiments, a real vehicle in-the-loop test system configured to test a real vehicle may comprise at least an interaction module, a test task control module, a vehicle sensing module, a test situation module, an intelligent agent module, a map module, and a test task set module, and the procedure 400 of the real vehicle in-the-loop test method comprises the following steps:

Step 401: The interaction module generates an emulation test environment in response to that a second instruction entered by a user is received, and combines the emulation test environment with a preset test content to generate a test task.

In some embodiments, the interaction module may generate an emulation environment of a test task in response to a second instruction entered by the user, and then combine the emulation test environment with a preset test content to generate the test task. Here, the interaction module may provide a man-machine interaction interface for a real vehicle test to a user, and the user may configure, through the interaction module, a test task that needs to be tested by the real vehicle. It should be noted that, the emulation test environment in the test task may comprise at least a target test situation, a target map, and a target intelligent agent.

Specifically, in response to the second instruction entered by the user, the interaction module may select a target test situation from the test situation module and load it, select a target map from the map module and load it, select a target intelligent agent from the intelligent agent module and load it, and generate the emulation test environment in the test task that needs to be tested. Here, the target test situation, the target intelligent agent, and the target map are a test situation, an intelligent agent, and a map that form the emulation test environment in the test task.

In some optional implementations of some embodiments, the test situation module may store a great number of test situations. The test situation module may be in communication connection with the interaction module, such that the interaction module may acquire the target test situation required by the test task therefrom. The intelligent agent module may store a great number of intelligent agents. The intelligent agent may be various traffic elements of which motion states are determined based on a motion state of the real vehicle, such as pedestrians, bicycles, and cars. The intelligent agent module may be in communication connection with the interaction module, such that the interaction module may acquire the target intelligent agent required by the test task therefrom. The map module may store a great number of maps. The map module may also be in communication connection with the interaction module, such that the interaction module may acquire the target map required by the test task therefrom.

Step 402: The interaction module stores the test task to a test task set module in response to that a third instruction entered by the user is received.

In some embodiments, based on the test task acquired in step 301, the interaction module may store the test task to the test task set module in response to the third instruction entered by the user. The test task set module here may be configured to store historical test tasks.

In some optional implementations of some embodiments, when the task required to be tested is a historical test task stored in the test task set module, the interaction module may acquire the test task directly from the test task set module. This may improve the test efficiency of the test task.

Step 403: A test task control module receives a test task sent by the interaction module.

In some embodiments, the test task control module in the real vehicle in-the-loop test system may be connected to the interaction module therein through, for example, wireless communication, to cause the test task control module to receive the test task sent by the interaction module. The test task may comprise a test content and an emulation test environment. The test task may be described as testing a certain test content in a certain emulation test environment. For example, the test content may be "the performance of a decision control system of a real vehicle", the emulation test environment may be "a sunny day, a crossroad of an urban road without a traffic light, a pedestrian crossing the road", and the test task may be described as "testing the performance of a decision control system of a real vehicle in an emulation test environment of a pedestrian crossing the road at a crossroad of an urban road without a traffic light in a sunny day".

Step 404: A vehicle sensing module acquires, from a sensor of the real vehicle, first state information and first location information of the real vehicle.

In some embodiments, the vehicle sensing module in the real vehicle in-the-loop test system configured to test the real vehicle may acquire, from the sensor mounted on the real vehicle, the first state information and the first location information of the real vehicle. Here, the first state information and the first location information are state information and location information of the real vehicle before executing the test task.

Step 405: The test task control module loads the first state information and the first location information to the emulation test environment to cause the sensor to acquire environment information of the emulation test environment, and to control the real vehicle to execute the test task.

In some embodiments, the test task control module may be a module in the real vehicle in-the-loop test system of the real vehicle, and based on the first state information and the first location information of the real vehicle acquired in step 302, the test task control module may load the first state information and the first location information to the emulation test environment, such that the location and state of the real vehicle may be integrated with the emulation test environment. Then, the sensor of the real vehicle may sense the environment information of the emulation test environment where the real vehicle is located. Finally, the test task control module may control the real vehicle to execute the test task.

In some optional implementations, in the process of the real vehicle executing the test task, in some specific conditions, the interaction module may send a fourth instruction entered by the user to the test task control module, such that the test task control module may control the real vehicle to suspend or terminate the test task.

Step 406: The test task control module receives second state information and second location information of the real vehicle sent by the vehicle sensing module, generates the test result of the test task, and sends the test result to the interaction module.

In some embodiments, in the process of the real vehicle executing the test task, the sensor on the real vehicle can acquire the second state information and the second location information of the real vehicle where the sensor is located. Then, the vehicle sensing module may acquire, from the sensor, the second state information and the second location information, and send them to the test task control module. After receiving the second state information and the second location information, the test task control module may generate the test result of the test task according to them, and may send the test result to the interaction module, such that the user may acquire the test result through the interaction module.

In some optional implementations, the real vehicle in-the-loop test system may further comprise a monitoring module. The monitoring module may monitor working conditions of the test task control module, the vehicle sensing module, the interaction module, the test situation module, the intelligent agent module, the map module, and the test task set module.

It can be seen from FIG. 4 that, compared with the embodiments corresponding to FIG. 3, the procedure 400 of the real vehicle in-the-loop test method in some embodiments emphasizes the step of generating, by the interaction module, a test task in response to an instruction entered by the user. Therefore, the solution descried in some embodiments may select and load a target test situation, a target map, and a target intelligent agent from a test situation module, a map module, and an intelligent agent module, and may generate a great number of emulation test environments, such that the test is more complete. Moreover, the intelligent agent in the same emulation test environment can trigger multiple behaviors, which further improves the completeness of the test, and achieves higher accuracy of the test.

The test task control module, the interaction module, the test situation module, and the like in some embodiments of the present disclosure may generally be disposed in a terminal device or a server.

Figure 5:
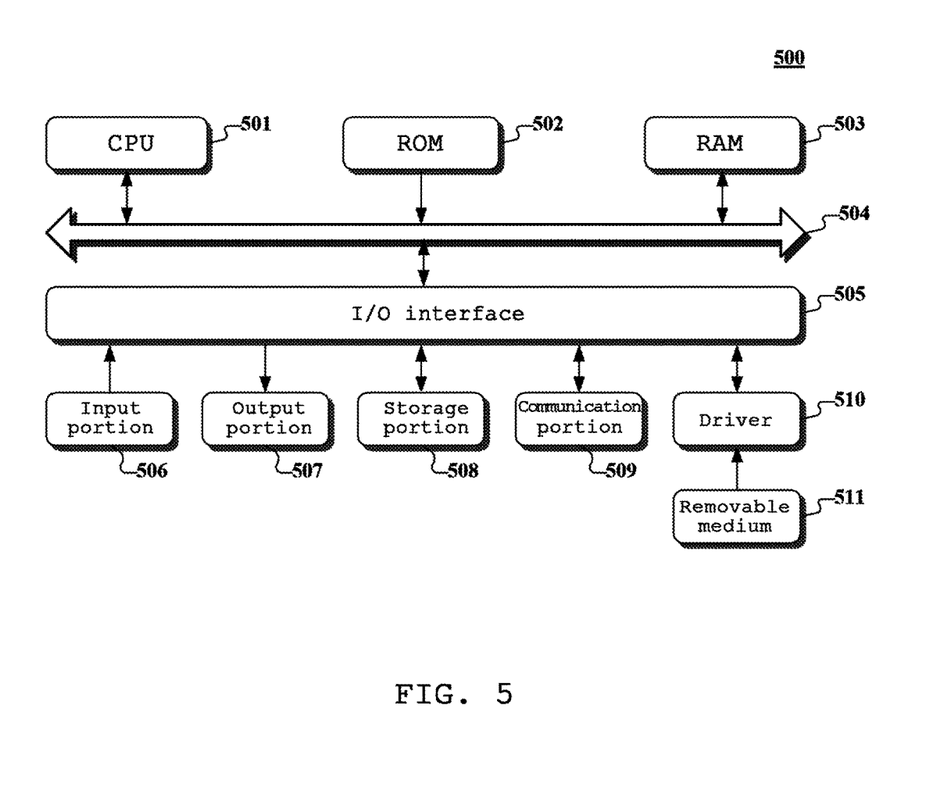
FIG. 5 is a schematic structural diagram of a computer system of a terminal device or a server applicable to implement some embodiments of the present disclosure.

Referring to FIG. 5, a schematic structural diagram of a computer system 500 adapted to implement a terminal apparatus or an emulation server of some embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to some embodiments of the present disclosure, the process described above may be implemented in a computer software program. For example, some embodiments of the present disclosure include a computer program product, which comprises a computer program that is tangibly embedded in a machine-readable medium. The computer program comprises program codes for executing the method of FIG. 2. In such embodiments, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The modules involved in some embodiments of the present disclosure may be implemented by way of software. The described modules may also be provided in a processor, for example, described as: a processor, comprising an interaction module, a vehicle sensing module and a test task control module, where the names of these units or modules are not considered as a limitation to the units or modules.

In another aspect, the present disclosure further provides a non-volatile computer readable medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, the device includes: a test task control module receives the test task from the interaction module, the test task comprises a test content and an emulation test environment, the emulation test environment comprises a target test situation, a target map, and a target intelligent agent. A vehicle sensing module acquires first state information and first location information of the real vehicle from a sensor on the real vehicle, the first state information and the first location information are state information and location information of the real vehicle before executing the test task. The test task control module loads the first state information and the first location information to the emulation test environment, causing the sensor to acquire environment information of the emulation test environment. The test task control module controls the real vehicle to execute the test task. The test task control module receives second state information and second location information of the real vehicle sent by the vehicle sensing module, generates the test result of the test task; and sends the test result to the interaction module. The second state information and the second location information are state information and location information of the real vehicle acquired in real time from the sensor of the real vehicle by the vehicle sensing module in the process of executing the test task.

The foregoing is only a description of some embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to), technical features with similar functions.

Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and disclosures, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A real vehicle in-the-loop test system, comprising:
   at least one processor; and
   a memory storing instructions, the instructions when executed by the at least one processor, cause the at least one processor to perform operations, the operations comprising:
   providing a man-machine interaction interface for a user, and acquiring, in response to a first instruction entered by the user, a test task corresponding to the first instruction, the test task comprising a test content and an emulation test environment, the emulation test environment comprising a test situation, a map, and an intelligent agent;
   acquiring state information and location information of a real vehicle, and environment information of the emulation test environment where the real vehicle is located; and
   loading the state information and the location information of the real vehicle to the emulation test environment, acquiring environment information, controlling the real vehicle to execute the test task to generate a test result, and sending the test result to the user,
   wherein the acquiring the test task corresponding to the first instruction further comprises:
   selecting, in response to a second instruction entered by the user being received, a test situation, an intelligent agent, and a map corresponding to the second instruction, respectively, to generate the emulation test environment; and
   combining the emulation test environment with a preset test content to generate the test task, and storing the test task into a test task set module in response to a third instruction entered by the user being received.

2. The system according to claim 1, wherein the operations further comprise:
   storing the test situation;
   storing the intelligent agents, the intelligent agents comprising traffic elements of which motion states are determined based on a motion state of the real vehicle; and
   storing the maps.

3. The system according to claim 2, wherein the operations further comprise:
   storing historical test tasks into the test task set module; and
   selecting from the test task set module, in response to the first instruction entered by the user being received, the test task corresponding to the first instruction.

4. The system according to claim 3, wherein the controlling the real vehicle to execute the test task further comprises: controlling the real vehicle to suspend or terminate the test task; and the operations further comprise:
   suspending or terminating the test task in response to a fourth instruction entered by the user being received.

5. The system according to claim 4, wherein the operations further comprise:
   monitoring working conditions of the system.

6. A real vehicle in-the-loop test method, comprising:
   receiving, by a test task control module, a test task sent by an interaction module, the test task comprising a test content and an emulation test environment, and the emulation test environment comprising a target test situation, a target map, and a target intelligent agent;
   acquiring, by a vehicle sensing module, first state information and first location information of a real vehicle from sensors on the real vehicle, the first state information and the first location information being state information and location information of the real vehicle before executing the test task;
   loading, by the test task control module, the first state information and the first location information to the emulation test environment, causing the sensors to acquire environment information of the emulation test environment; and controlling, by the test task control module, the real vehicle to execute the test task;
   receiving, by the test task control module, second state information and second location information of the real vehicle sent by the vehicle sensing module, generating a test result of the test task; and sending the test result to the interaction module, the second state information and the second location information being state information and location information of the real vehicle acquired in real time from the sensors of the real vehicle by the vehicle sensing module in the process of executing the test task;
   selecting and loading, by the interaction module in response to a first instruction entered by the user being received, a target test situation, a target intelligent agent, and a target map corresponding to the first instruction, respectively, from a test situation module, an intelligent agent module, and a map module, to generate the emulation test environment; and combining, by the interaction module, the emulation test environment with a preset test content to generate the test task, and storing the test task to a test task set module in response to a second instruction entered by the user being received.

7. The method according to claim 6, further comprising:
selecting, by the interaction module in response to a third instruction entered by the user being received, the test task corresponding to the third instruction from the test task set module.

8. The method according to claim 6, wherein after the controlling, by the test task control module, the real vehicle to execute the test task, the method further comprises:
controlling, by the test task control module, the real vehicle to suspend or terminate the test task in response to a fourth instruction sent by the interaction module being received.

9. The method according to claim 6, wherein the test situation module is configured to store a test situation;
the intelligent agent module is configured to store an intelligent agent, the intelligent agent comprising traffic elements of which motion states are determined based on a motion state of the real vehicle; and
the map module is configured to store a map.

10. The method according to claim 9, further comprising:
monitoring, by a monitoring module, working conditions of the test task control module, the interaction module, the vehicle sensing module, the test situation module, the intelligent agent module, the map module, and the test task set module.

11. A non-transitory computer storage medium storing a computer program, which when executed by one or more computers causes the one or more computers to perform operations comprising:
receiving, by a test task control module, a test task sent by an interaction module, the test task comprising a test content and an emulation test environment, and the emulation test environment comprising a target test situation, a target map, and a target intelligent agent;
acquiring, by a vehicle sensing module, first state information and first location information of a real vehicle from sensors on the real vehicle, the first state information and the first location information being state information and location information of the real vehicle before executing the test task;
loading, by the test task control module, the first state information and the first location information to the emulation test environment, causing the sensors to acquire environment information of the emulation test environment; and controlling, by the test task control module, the real vehicle to execute the test task;
receiving, by the test task control module, second state information and second location information of the real vehicle sent by the vehicle sensing module, generating a test result of the test task; and sending the test result to the interaction module, the second state information and the second location information being state information and location information of the real vehicle acquired in real time from the sensors of the real vehicle by the vehicle sensing module in the process of executing the test task;
selecting and loading, by the interaction module in response to a first instruction entered by the user being received, a target test situation, a target intelligent agent, and a target map corresponding to the first instruction, respectively, from a test situation module, an intelligent agent module, and a map module, to generate the emulation test environment; and
combining, by the interaction module, the emulation test environment with a preset test content to generate the test task, and storing the test task to a test task set module in response to a second instruction entered by the user being received.

12. The non-transitory computer storage medium according to claim 11, the operations further comprising:
selecting, by the interaction module in response to a third instruction entered by the user being received, the test task corresponding to the third instruction from the test task set module.

13. The non-transitory computer storage medium according to claim 11, the operations further comprising:
controlling, by the test task control module, the real vehicle to suspend or terminate the test task in response to a fourth instruction sent by the interaction module being received.

14. The non-transitory computer storage medium according to claim 11, wherein the test situation module is configured to store a test situation;
the intelligent agent module is configured to store an intelligent agent, the intelligent agent comprising traffic elements of which motion states are determined based on a motion state of the real vehicle; and
the map module is configured to store a map.

15. The non-transitory computer storage medium according to claim 11, the operations further comprising:
monitoring, by a monitoring module, working conditions of the test task control module, the interaction module, the vehicle sensing module, the test situation module, the intelligent agent module, the map module, and the test task set module.

* * * * *